United States Patent
Wang

Patent Number: 5,289,138
Date of Patent: Feb. 22, 1994

[54] APPARATUS FOR SYNCHRONOUSLY SELECTING DIFFERENT OSCILLATORS AS SYSTEM CLOCK SOURCE

[75] Inventor: Eugene Wang, Fremont, Calif.

[73] Assignee: Amdahl Corportion, Sunnyvale, Calif.

[21] Appl. No.: 922,209

[22] Filed: Jul. 30, 1992

[51] Int. Cl.⁵ .................... H03B 27/00; H01J 19/82; H04B 1/10
[52] U.S. Cl. .................... 331/49; 307/219; 307/269; 370/105; 375/104; 375/108; 375/118; 331/2; 331/7; 331/14; 331/46; 331/55; 331/64
[58] Field of Search .......... 307/219, 269; 370/105; 375/104, 108, 118; 331/2, 7, 14, 46, 49, 55, 64, 172

[56] References Cited
U.S. PATENT DOCUMENTS

| | | | |
|---|---|---|---|
| 3,594,656 | 7/1971 | Tsukamoto | 331/49 |
| 4,229,699 | 10/1980 | Frissell | 375/108 |
| 4,882,738 | 11/1989 | Suzuki | 331/49 |

Primary Examiner—Robert J. Pascal
Assistant Examiner—Arnold Kinkead
Attorney, Agent, or Firm—Fliesler, Dubb, Meyer & Lovejoy

[57] ABSTRACT

An apparatus is provided for synchronously selecting different oscillators as the system clock source. The apparatus is comprised of two oscillator selectors. Each of the oscillator selectors has as its inputs the output of each of the oscillators and a three-bit command code which indicates which of the oscillators is to be selected by the oscillator selector and a single clock output. A different oscillator may be selected by each of the oscillator selectors at the same time. The output of the oscillator selectors are inputs to the clock controller. The clock controller also receives command signals for controlling the switching of the clock controller between the outputs of the two oscillator selectors. The output of the clock controller is the clock source for the system and a status signal indicating which oscillator selector is presently being used.

8 Claims, 2 Drawing Sheets

APPARATUS FOR SYNCHRONOUSLY SELECTING DIFFERENT OSCILLATORS AS SYSTEM CLOCK SOURCE

BACKGROUND OF THE INVENTION

1. Field of the Invention

The present invention relates to an apparatus for synchronously providing and selecting an oscillator from a plurality of oscillators to act as the system clock.

2. Description of the Related Art

In computer systems where oscillators are used as a clock source, it is very helpful to change the clock frequency to detect any marginal timing problem. One such method is to provide several oscillators and a controller to select one of them as the system clock source. The controller receives each of the outputs of the oscillators and also a select signal for each of the oscillators for controlling which oscillator is to be used. The controller interconnects the gate means for each of the oscillators such that no two oscillators may be turned on at the same time and to allow additional synchronization means to synchronize the system controller to the new oscillator before the new oscillator output is supplied as the clock signal for the system.

In large computer systems, the controller will typically be implemented in large scale integrated circuits. To facilitate the testing of these chips, usually the chip tester needs to treat the clock input pins as special cases because of the latches used to synchronize the new oscillator. This special treatment includes the ability to issue small pulses having a high bandwidth resulting in an increase in costs of the tester itself. Therefore, usually only a limited number of pins on the chip tester can be used as clock input pins. The number of clock input pins is a function of a number of oscillators that can act as the clock for the system. The user therefore has the option of increasing the cost of the chip tester by providing the necessary pin connection to test the plurality of oscillators used by the controller or to reduce the test coverage which is undesirable.

SUMMARY OF THE INVENTION

Accordingly, it is an object of the present invention to provide an apparatus which can select between a plurality of oscillators and synchronously provide the selected oscillator as the clock for the system.

It is another object of the invention to provide such an apparatus where the apparatus is part of a large scale integrated circuit when all the oscillators may be checked by a chip tester as a regular path and the clock by the use of only two clock pins.

The apparatus is comprised of two oscillator selectors. Each of the oscillator selectors has as its inputs the output of each of the oscillators and a three-bit command code which indicates which of the oscillators is to be selected by the oscillator selector and a single clock output. A different oscillator may be selected by each of the oscillator selectors at the same time. The output of the oscillator selectors are inputs to the clock controller. The clock controller also receives command signals for controlling the switching of the clock controller between the outputs of the two oscillator selectors. The output of the clock controller is the clock source for the system and a status signal indicating which oscillator selector is presently being used.

BRIEF DESCRIPTION OF THE DRAWINGS

The invention will be described with respect to the particular embodiments thereof and reference will be made to the drawings, in which.

DESCRIPTION OF THE PREFERRED EMBODIMENTS

Figure 1:
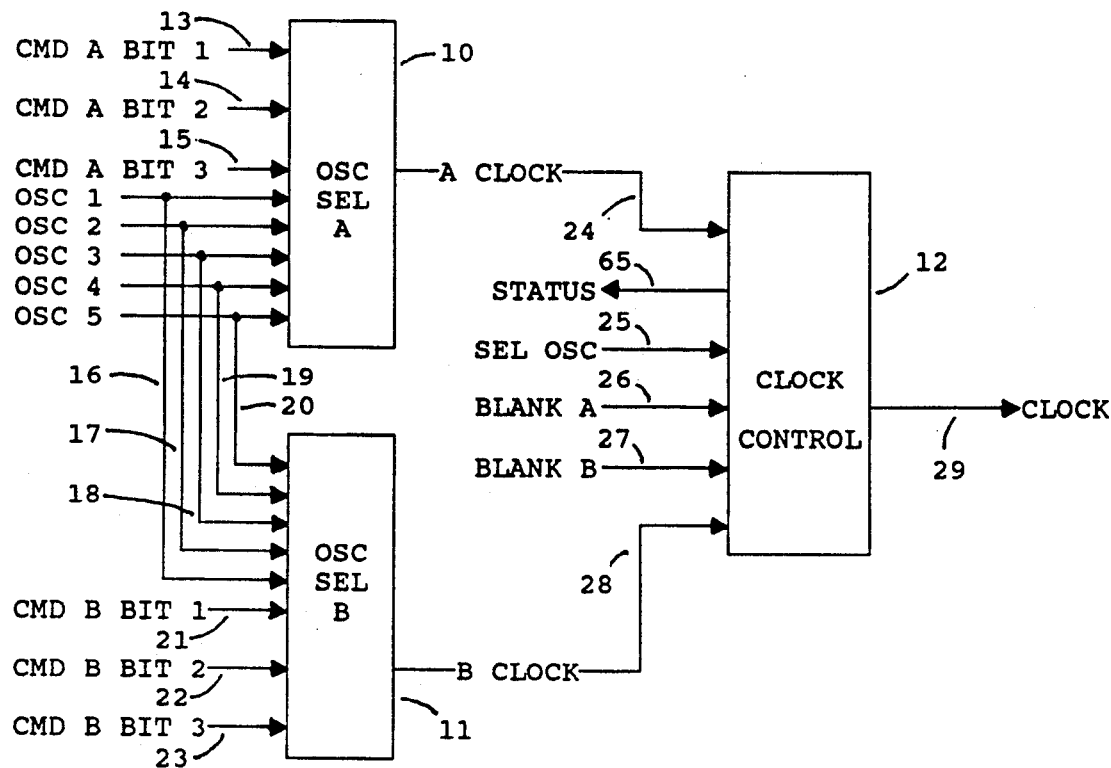
FIG. 1 is a diagram of the apparatus for synchronously selecting different oscillators as the system clock source.

Referring to FIG. 1, the apparatus for synchronously selecting one of a plurality of oscillators to be the system clocks is shown. The apparatus is comprised of oscillator selector A 10, oscillator selector B 11 and clock controller 12. Oscillator selector A 10 and oscillator selector B 11 are identical in construction. Oscillator selector A 10 receives a three-bit command CMD A on lines 13, 14 and 15 and the output of five oscillators on lines 16, 17, 18, 19 and 20. Oscillator selector A 10 provides the output of the selected oscillator as an A CLOCK output on line 24. Oscillator selector B receives a three-bit command CMD B on lines 21, 22 and 23, and the output of each of the five oscillators on lines 16, 17, 18, 19 and 20. Oscillator selector B 11 provides the output of the selected oscillator as B CLOCK on line 28. Clock controller 12 receives the A CLOCK of oscillator selector A 10 on line 24 and the B CLOCK on line 28 of oscillator selector B 11. Clock controller also receives command signals select oscillator SEL OSC on line 25, BLANK A on line 26 and BLANK B on line 27. The output line 29 of the clock controller 12 provides the clock for the system. Clock controller 12 also provides a STATUS signal on line 65 to indicate whether CLOCK A or CLOCK B is presently being used as the system clock.

Figure 2:
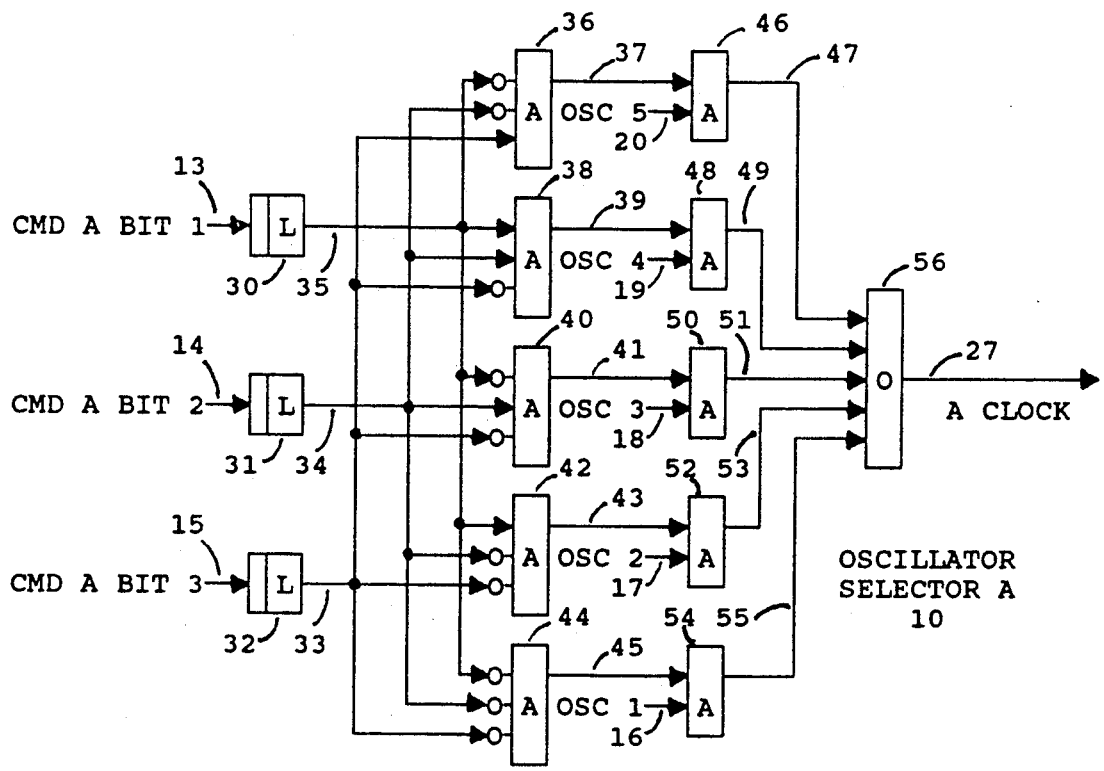
FIG. 2 is a logic diagram of an oscillator selector used in FIG. 1.

Referring to FIG. 2, the logic comprising oscillator selector A 10 is shown. In that oscillator selector A 10 and oscillator selector B 11 are identical in structure, only oscillator selector A 10 will be discussed. The three-bits code, as shown in Table 1, of command CMD A is provided on lines 13, 14 and 15 and stored in latches 30, 31 and 32. The output of latch 30 is on line 35, of latch 31 is on line 34 and of latch 32 is on line 33. The output of each of the latches are connected to the inputs of each of AND's 36, 38, 40, 42 and 44 which effectively decode the three-bit code stored in latches 30, 31 and 32. AND 46 has the first input from AND 36 via line 37 and a second input of the output of oscillator 5 via line 20. AND 48 has a first input from AND 38 via line 39 and a second input of the output of oscillator 4 via line 19. AND 50 has a first input from AND 40 via line 41 and a second input from the output of oscillator 3 via line 18. AND 52 has a first input from AND 42 via line 43 and a second input of the output of oscillator 2 via line 17. AND 54 has a first input from AND 44 via line 45 and a second input of the output of oscillator 1 via line 16. OR 56 has a first input from AND 46 via line 47, a second input from AND 48 via line 49, a third input from AND 50 via line 51, a fourth input from AND 52 via line 53 and a fifth input, from AND 54 via line 55. The output of OR 56 on line 27 is the A CLOCK signal to be used by controller 12.

Figure 3:
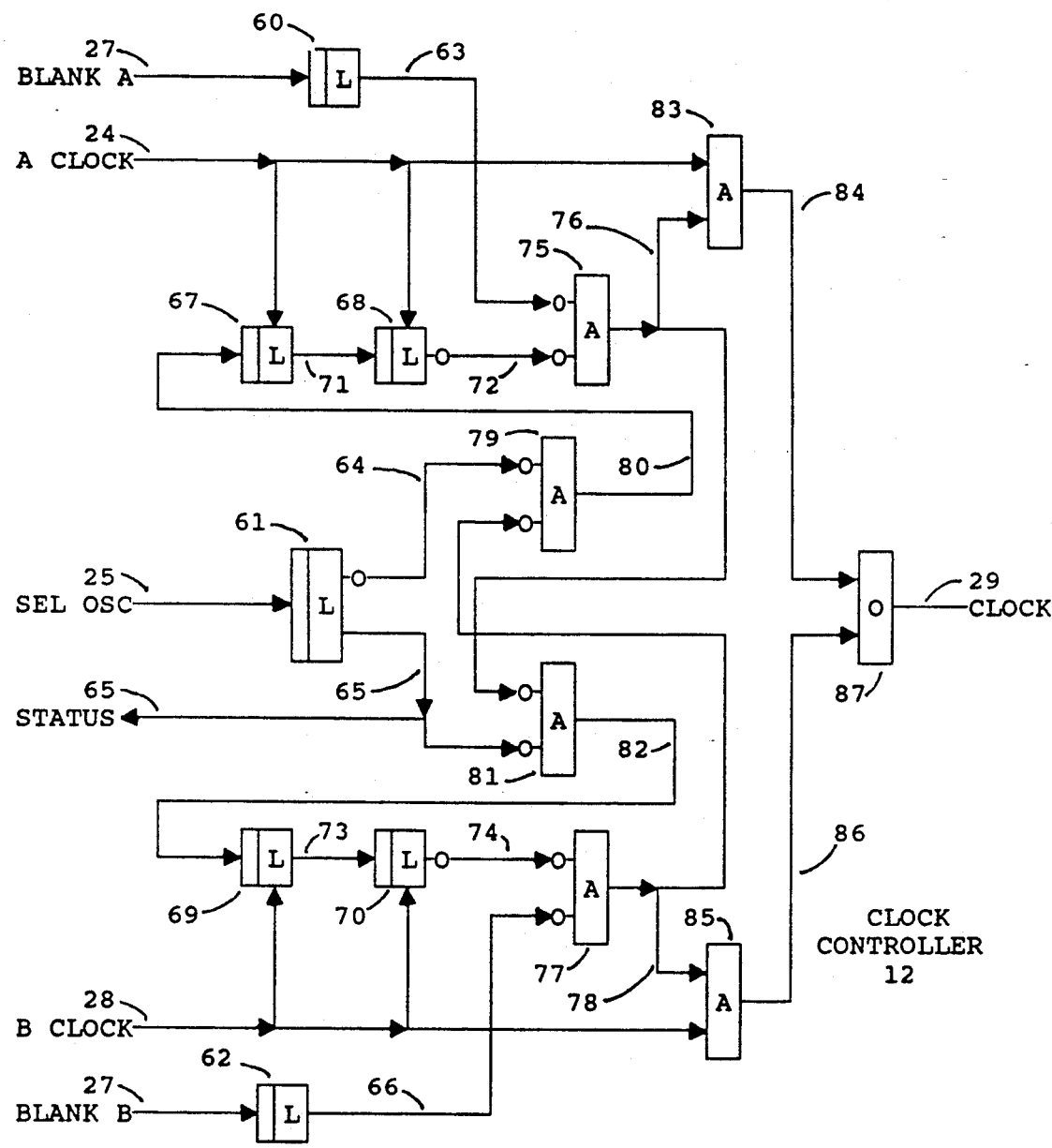
FIG. 3 is a logic diagram of the clock controller used in FIG. 1.

Referring to FIG. 3, the clock controller 12 is shown in detail. Control signal BLANK A is connected via line 27 into latch 60 whose output on line 63 is connected to a negative input of AND 75. The A CLOCK signal on line 24 from oscillator selector A 10 is connected to AND 83 and latches 67 and 68. Command signal select oscillator SEL OSC is connected via line 25 to latch 61 which has a first negative output on line 64 connected to the negative input of AND 79 and a positive output on line 65 connected to the negative input of AND 81 and is the STATUS signal for the status of the clock controller 12. The B CLOCK signal of oscillator selector B 12 is connected via line 28 to AND circuit 85 and latches 69 and 70. Command BLANK B is connected via line 27 to latch 62 whose output is connected via line 66 to the negative input of AND 77. The output of AND 79 is connected via line 80 to the input of latch 67. The output of AND 81 via line 82 is connected to the input of latch 69. The output of latch 67 is connected to latch 68 via line 71. The negative output of latch 68 is connected to the negative input of AND 75. The output of latch 69 is connected via line 73 to latch 70. The negative output of latch 70 is connected via line 74 to the negative input of AND 77. The output of AND 75 is connected via line 76 to AND 83 and to the negative input of AND 82. The output of AND 77 is connected via line 78 to AND 85 and to the negative input of AND 79. OR 87 has a first input from AND 83 via line 84 and a second input from AND 85 via line 86. The output on line 29 of OR 87 is the CLOCK for the system.

In operation, the three-bit command signals, COMMAND A and COMMAND B, is a three-bit code, as shown in Table 1, for selecting oscillators 1, 2, 3, 4 or 5.

TABLE 1

|  | COMMAND | | |
| --- | --- | --- | --- |
|  | Bit 3 | Bit 2 | Bit 1 |
| OSC 1 | 0 | 0 | 0 |
| OSC 2 | 0 | 0 | 1 |
| OSC 3 | 0 | 1 | 0 |
| OSC 4 | 0 | 1 | 1 |
| OSC 5 | 1 | 0 | 0 |

The command in its present format can select up to eight oscillators and may be expanded by adding additional bits to select greater than eight oscillators.

The commands CMD A, CMD B, SEL OSC, BLANK A and BLANK B are provided in proper sequence by means of a microprocessor or by a state machine. The microcode for a microprocessor or the sequence of operation of a state machine for selecting a new oscillator as the clock is set forth below.

```
begin
    scanout (SEL OSC);
if SEL OSC=1, then begin
        scanin(BLANK B,1);
        scanin(CMD B);
        wait a few cycles;
        scanin(BLANK B,0);
        scanin(SEL OSC,0);
    end else begin
        scanin(BLANK A,1);
        scanin(CMD A);
        wait a few cycles
        scanin(BLANK A,0)
        scanin(SEL OSC,1)
    end;
```

When an oscillator selector changes from one oscillator to another oscillator, transient signals can appear on line 24 or 28 which may cause latches 67,68,69 and 70 to go into a metastable state. BLANK A and BLANK B commands to latches 60 and 62 prevents any of these transient signals from appearing in the CLOCK on line 29.

The invention will further be described with reference to FIG. 1, 2 and 3 by way of an example for a switching procedure. Assume that the apparatus is providing the output of oscillator 5 on line 20 as the system clock on line 29 via oscillator selector B 11. At this time latch 61 will be set to a zero, latches 60 and 62 will be set to a zero, latches 67 and 68 will be set to a zero, and latches 69 and 70 will be set to a one. AND 85 will be conditioned by the high output of AND 77 to allow B CLOCK on line 28 to appear on line 86 as an input to OR 87 and then as the clock on line 29. AND 83 will be deconditioned by the low output of AND 75 via line 76. The output of AND 79 will be low and the output of AND 81 will be high.

Next assume it is desired to change the output clock on line 29 to the output of oscillator 3. First, the status of latch 61 is tested by the microprocessor or state machine to determine whether latch 61 is set to a one or a zero by means of the STATUS signal on line 65. If latch 61 is set to zero then the B CLOCK is presently being used. If latch 61 is set to one, then the A CLOCK is presently being used. The system will provide the new clock signal via the oscillator selector A or B that is presently not being used to supply the clock. In that latch 61 in this case is a zero, this will indicate that the B CLOCK is presently being used and that oscillator selector A 10 will be used to provide the new clock. The BLANK A command signal is then issued via line 27 setting latch 60 to a one. The setting of latch 60 to a one will decondition AND 75 causing AND 75's output to be low regardless of the state of the signal on line 72 to AND 75. The low output of AND 75 will decondition AND 83, thereby not allowing A CLOCK to pass through AND 83 to OR 87. The three-bit, 010, code for oscillator 3 will then be issued as COM A Bit 1, Bit 2 and Bit 3 on lines 13, 14 and 15 and a set into latches 30, 31 and 32. This will cause the output of AND 40 to be high which will condition AND 50 via line 41 such that oscillator 3 appears on line 51 to OR 56 and, finally, as A CLOCK on line 27. Since the issuing of the procedure commands by the state machines is asynchronous to the system clock, the procedure waits a few cycles to allow the A CLOCK to stabilize. The A CLOCK appears on line 24 as an inputs to latches 67, 68 and AND 83. At this time, latch 67, receiving a low input on line 80 from AND 79 will remain at a zero value. This will cause latch 68 to remain at a zero value. Therefore, AND 75 will be deconditioned by both the high output on line 63 of latch 60 and the low output of latch 68 on line 72. As such, the output of oscillator 3 appearing as A CLOCK on line 24 will not be passed through AND 83. Next, the BLANK A command on line 27 will set latch 60 to a zero which will condition one input of AND 75. The command select oscillator SEL OSC on line 25 will then set latch 61 to a one which will cause the output of AND 81 on line 82 to be low. The low output of AND 81 will cause a zero to be read into latches 73 and 74. A zero in latch 74 will cause the output of AND 75 to be low. A low output of AND 75 will decondition AND 85 thereby turning off the B CLOCK. The low output of AND 75 will also cause the output of AND 80 to be high. The next clock pulse of A CLOCK will set latch 67 to a one and the following clock pulse of A CLOCK will set latch 68 to one. The output of AND 75 will be high thereby conditioning AND 83 to allow A CLOCK to appear on line 84. A CLOCK will pass through OR 87 and appear on line 29 as the clock. Therefore, the output of the system clock has been switched to oscillator 3.

The apparatus has been prepared for the next request to switch oscillators which will be done by oscillator selector B 11 to produce the B CLOCK for controller 12. Effectively, controller 12 alternates between A CLOCK and B CLOCK each time a selection procedure is performed.

Referring to FIG. 1, while the entire circuit apparatus as shown in FIG. 1 can be incorporated within a large scale integrated circuit, lines 24 and 28 may be brought off the chip and then returned to the chip where the connection between the output and input are made by printed circuit wires on a board. During testing procedures, the printed circuit wire can be disconnected such that each of the clocks may be tested as a regular path and only the two clock paths of clock controller 12 must be viewed as a special case. This obviously reduces the expense and testing load of the chip tester and provides full functional testing of the oscillators and the clock circuitry on a large scale integrated circuit.

While the invention has been particularly shown and described with reference to the preferred embodiment thereof, it will be understood by those skilled in the art that changes in form and detail may be made therein without departing from the spirit and scope of the invention. Given the above disclosure of general concepts and specific embodiments, the scope of the protection sought is defined by the following claims.

What is claimed is:

1. An apparatus for synchronously selecting different oscillators as a system clock within a system having a plurality of oscillators and a control means for generating selection signals indicating which oscillator is to be selected and sequence control signals for controlling the clock selection process of said apparatus, said control signals being asynchronous to said oscillator signals, said apparatus comprising:
    a first oscillator selection means, receiving the output of each of said plurality of oscillators and said selection signals, for selecting the output of one of said plurality of oscillator in response to said selection signals and for providing said selected output of said selected oscillator as the A CLOCK;
    a second oscillator selection means, receiving the output of each of said plurality of oscillators and said selection signals, for selecting the output of one of said plurality of oscillator in response to said selection signals and for providing said selected output of said selected oscillator as the B CLOCK; and
    a clock control means, receiving said A CLOCK, said B CLOCK and said control signals, for switching between said A CLOCK and said B CLOCK in response to said control signals to provide either said A CLOCK or said B CLOCK as the system clock to said system and for providing a STATUS signal to said control means for indicating whether said A CLOCK or said B CLOCK is presently selected as the system clock, said clock control means including a blanking means for preventing clock signals or noise from appearing on the system clock during the time that said first or second oscillator selection means is in the process of selecting a new oscillator, interlocking means for controlling the sequence of switching between said A CLOCK and said B CLOCK thereby preventing said A CLOCK and said B CLOCK from appearing as the system clock as the same time and a synchronizing means for synchronizing said control signals to said A CLOCK or said B CLOCK during a switching process.

2. The apparatus of claim 1 wherein said first oscillator selection means comprises:
    first decoding means for receiving and decoding said selection signals to provide an oscillator selection signal indicative of the oscillator indicated by said selection signal; and
    first selecting means for receiving the output of each of said plurality of oscillators, for selecting one of said oscillators in response to said oscillator selection signal and for providing said output of said selected oscillator as the A CLOCK.

3. The apparatus of claim 2 wherein said second oscillator selection means comprises:
    second decoding means for receiving and decoding said selection signals to provide an oscillator selection signal indicative of the oscillator indicated by said selection signal; and
    second selecting means for receiving the output of each of said plurality of oscillators, for selecting one of said oscillators in response to said oscillator selection signal and for providing said output of said selected oscillator as the B CLOCK.

4. The apparatus of claim 1 wherein said clock control means further comprises:
    first gate means, receiving said A CLOCK, for providing said A CLOCK as the system clock when said first gate means is conditioned;
    second gate means, receiving said B CLOCK, for providing said B CLOCK as the system clock when said second gate means is conditioned;
    switching means for conditioning either said first or second gate means in response to said A CLOCK, said B CLOCK and said control signals; and
    output means for receiving said A CLOCK from said first gate means or said B CLOCK from said second gate means and for providing said received A CLOCK or B CLOCK as the clock signal for said system.

5. The apparatus of claim 4 wherein said control signals include a SELECT signal indicating whether said A or B CLOCK is to be selected and said synchronizing means comprises:
    first means for synchronizing said clock control means to said A CLOCK when switching to said A CLOCK in response to said asynchronous SELECT by requiring said A CLOCK to participate in the conditioning of said first gate means signal; and
    second means for synchronizing said clock control means to said B CLOCK when switching to said B CLOCK in response to said asynchronous SELECT by requiring said B CLOCK to participate in the conditioning of said second gate means signal.

6. The apparatus of claim 4 wherein said control signals include a BLANK A signal and a BLANK B signal and said blanking means further comprises:
   first means in response to said BLANK A signal for disenabling said first gate means when said first oscillator selection means is in the process of selecting a different oscillator;
   second means in response to said BLANK B signal for disenabling said second gate means when said second oscillator selection means is in the process of selecting a different oscillator.

7. The apparatus of claim 4 wherein said control signals includes a SELECT signal, a BLANK A signal and a BLANK B signal where said SELECT signal is issued upon the completion of said BLANK A signal or said BLANK B signal, and said interlocking means comprises:
   means for inhibiting the conditioning of said first gate means by said A CLOCK until said SELECT signal is generated to select said A CLOCK after said BLANK A signal is turned off indicating that said first oscillator selection means has completed the selection process for providing said selected oscillators output as said A CLOCK and inhibiting the conditioning of said second gate means by said B CLOCK until said SELECT signal is generated to select said B CLOCK after said BLANK B signal is turned off indicating that said second oscillator selection means has completed the selection process for providing said selected oscillators output as said B CLOCK thereby preventing said first gate means and said second gate means from being enable at the same time.

8. The apparatus of claim 1 wherein said clock selection means generates a said STATUS signal which indicates that CLOCK B is presently selected thereby causing said SELECT to select CLOCK A when said SELECT signal is next issued and generates a said STATUS signal which indicates that LOCK A is presently selected causing said SELECT signal to select CLOCK B such when said SELECT signal is next issued thereby causing said apparatus to alternately switch between CLOCK A and CLOCK B.

* * * * *

UNITED STATES PATENT AND TRADEMARK OFFICE
CERTIFICATE OF CORRECTION

PATENT NO. : 5,289,138
DATED : February 22, 1994
INVENTOR(S) : Eugene Wang

It is certified that error appears in the above-identified patent and that said Letters Patent is hereby corrected as shown below:

Column 6, line 11, after "clock", "as" should be --at--;

Column 8, line 17, "LOCK" should be --CLOCK--.

Signed and Sealed this

Ninth Day of April, 1996

Attest:

BRUCE LEHMAN

Attesting Officer

Commissioner of Patents and Trademarks